F. W. DE JAHN.
PRODUCTION OF NITRIC ACID.
APPLICATION FILED MAY 2, 1910.
1,023,133.
Patented Apr. 16, 1912.
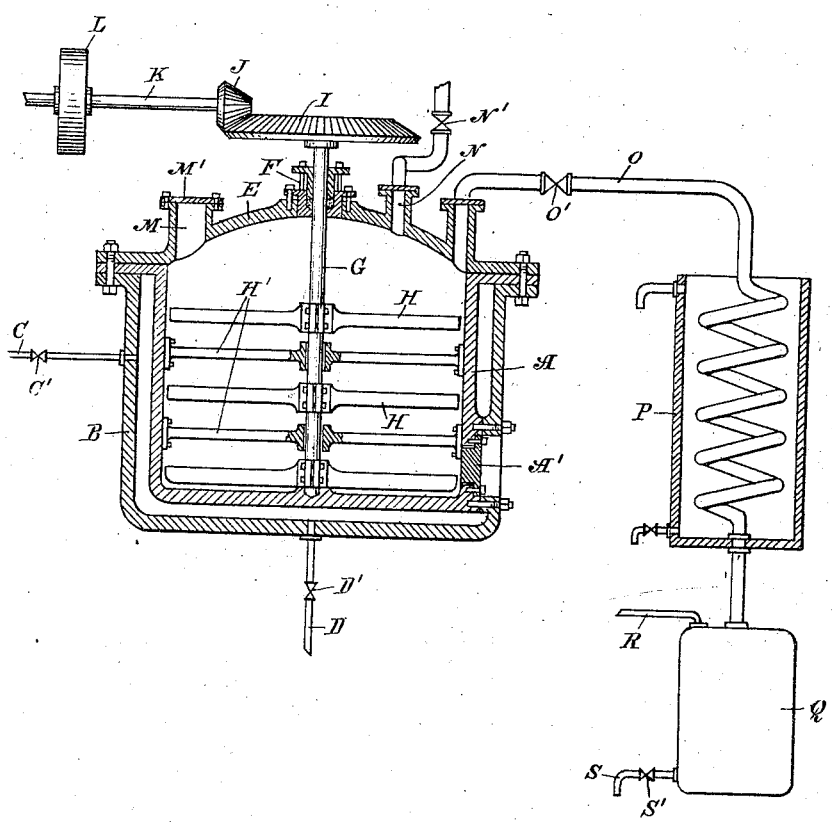
WITNESSES:
INVENTOR
FREDRIK W. de JAHN
BY
ATTORNEYS

UNITED STATES PATENT OFFICE.

FREDRIK W. DE JAHN, OF NEW YORK, N. Y., ASSIGNOR TO GENERAL CHEMICAL COMPANY, OF NEW YORK, N. Y., A CORPORATION OF NEW YORK.

PRODUCTION OF NITRIC ACID.

1,023,133.  Specification of Letters Patent.  Patented Apr. 16, 1912.

Application filed May 2, 1910. Serial No. 558,831.

*To all whom it may concern:*

Be it known that I, FREDRIK W. DE JAHN, a subject of the King of Norway, and resident of the borough of Manhattan, city, county, and State of New York, have invented certain new and useful Improvements in the Production of Nitric Acid, of which the following is a specification.

This invention relates to the production of nitric acid from a nitrate and sulfuric acid.

Broadly speaking, it consists in bringing these two things together under such conditions that a practically quantitative yield of strong nitric acid is obtained not accompanied by any, or very little, of the decomposition products of nitric acid. A further advantage is the economy in actual operation thus achieved, since heating to a lower degree of temperature and for a shorter time than under the old process is needed and the accompanying smaller rate of wear and tear of the apparatus.

This invention consists more specifically in bringing a nitrate, for example sodium nitrate, and sulfuric acid together in a vacuum still of any suitable construction, provided with a stirring device and maintaining a vacuum and a stirring of the material in the still while heating the contents of the still to a suitable temperature, which lies below that at which the sodium bisulfate so formed (known technically also as niter cake and hereinafter called niter cake) melts; this latter temperature is approximately 384° F.=196° C.; 302° F. = 150° C. is a suitable temperature for the conduct of this operation, in accordance with this, my invention.

This invention is based upon the discovery made by me that the decomposition of sodium nitrate and of calcium nitrate by means of sulfuric acid is practically complete at a temperature below 384° F. if a vacuum be maintained and if the mass be stirred during the heating. In the prior practice literature, and patents, it is generally stated that in order to obtain such practically complete decomposition of sodium nitrate by means of sulfuric acid, the temperature of the mass will have to be raised above the melting point of the sodium bisulfate formed. I have found that even when a full vacuum (but without stirring) is used the mass must be heated to a temperature above its melting point to get complete decomposition of the sodium nitrate, and I have further found that if, when the vacuum is used, the mass be properly stirred, the temperature need not go as high as the melting point of the sodium bisulfate formed; in fact that with proper attention the temperature need not exceed 302° F.=150° C.; under these latter conditions the sodium bisulfate formed is a tractable powder, which is a desirable property, and is not a hard mass or a hard lumpy material as it is under all the old processes and practices.

I illustrate the nature of this, my invention, by means of the following examples, but in so doing I wish to be understood as not limiting myself to the exact details there shown since these can be varied and altered without departing from the nature of my invention.

Example I: I place in the still three thousand (3000) lbs. of sodium nitrate, produce a partial vacuum, (say six (6) inches mercury) therein by means of a vacuum pump; then I draw into the still three thousand two hundred and seventy (3270) lbs. of sulfuric acid, containing 98% $H_2SO_4$, then I gradually raise the temperature of the charge in the still to 275° F.=135° C. as shown by the thermometer and maintain it there until the distillation is completed; when the distillation slows down at the six inch vacuum I gradually raise the vacuum to twenty-eight (28) inches of mercury. The niter cake left in the still is generally in the form of a powder and, practically speaking, contains no undecomposed sodium nitrate. The nitric acid so obtained is, practically speaking, free from decomposition products of nitric acid.

The apparatus which I find preferable may be described as follows, reference being had to the accompanying drawing showing a vertical section of the apparatus in which—

A represents a closed vessel for the mixture. This vessel is preferably surrounded by a jacket B into which water or steam may be introduced through the pipe C for maintaining the temperature of the vessel A at the desired point. A pipe D may be provided for withdrawing the water or steam from the jacket B it being understood that both of the pipes C and D are preferably controlled by means of valves C' and D' respectively. The vessel A is closed through the medium of a cover E in which is secured a stuffing box F through which the shaft G extends. The said shaft G has its inner end journaled in the bottom of the vessel A. Stirring arms H are secured to said shaft at intervals within the vessel A and stationary baffle bars H' are located between the stirring arms for the purpose of holding the material and also serve as additional bearings for the shaft G. A bevel gear I is fastened to the upper end of the shaft G and meshes with a bevel pinion J carried by a shaft K, rotatably mounted in suitable stationary bearings and provided with a belt pulley L to which power may be applied in any convenient manner. The cover E is provided with a charging aperture M for the reaction mixture, said aperture being normally closed by means of a cover M'. The said cover E is further provided with an inlet N controlled by a valve N', through which the sulfuric acid is introduced.

O is an outlet pipe for the nitric acid vapors, controlled by a valve O' and connected with a condenser P.

Q is a vacuum receiver for the nitric acid, connected with the condensing coil located in the condenser P the air being exhausted from said receiver through a pipe R.

S is an outlet pipe controlled by a valve S'. The vessel A, is provided with a suitable door A' for cleaning purposes.

I have further found that by substituting calcium nitrate for sodium nitrate in the foregoing Example I, I can arrive at equally satisfactory results by maintaining similar conditions of temperature and pressure. This is illustrated by following example.

Example II: I place in the still one hundred and fifty (150) lbs. of calcium nitrate containing, for example, 76% true calcium nitrate $(Ca(NO3)_2$ 0.7% of calcium oxid (CaO) and 24% of water ($H_2O$); to this I add eighty (80) lbs. of sulfuric acid containing ninety-five (95) per cent. of sulfuric acid ($H_2SO_4$); I now gradually raise the temperature of the still and its contents to two hundred and seventy-five (275) degrees Fahrenheit (=135° C.) as shown by the thermometer, having a low vacuum of six (6) inches of mercury at the start and I gradually raise this vacuum to twenty-eight (28) inches of mercury whenever distillation slackens, maintaining the temperature above given throughout the operation and until the distillation is completed. The resulting calcium sulfate is in powder form. In this example also the salient features of this, my invention, are contained, namely, a practically quantitative yield of strong nitric acid not accompanied by any or very little of the decomposition products of nitric acid, a rarefied atmosphere and a temperature less than that of the melting point of niter cake, and a pulverulent solid residue.

In the following claims I use the expression "rarefied atmosphere" as referring to atmospheric pressures in the containers of less than the normal.

I claim:

1. The process which consists in stirring a nitrate and an acid together in a rarefied atmosphere while heating the material to a temperature at which the nitric acid distils off which temperature is below that at which the niter cake formed will melt.

2. The process which consists in stirring a nitrate and an acid together in a rarefied atmosphere while heating the material to a temperature at which the nitric acid distils off and below 384 degrees Fahrenheit.

3. The process which consists in stirring a mixture of sodium nitrate and sulfuric acid together in a rarefied atmosphere while heating the materials to a temperature below the melting point of the niter cake formed and distilling off the nitric acid produced.

4. The process which consists in stirring a mixture of sodium nitrate and sulfuric acid together in a rarefied atmosphere while heating the material to a temperature below the melting point of the niter cake formed, distilling off the nitric acid so produced and obtaining the niter cake in pulverulent or friable condition.

5. The process which consists in stirring a mixture of sodium nitrate and sulfuric acid together in a rarefied atmosphere while heating the materials to a temperature below the melting point of the niter cake formed, driving off the nitric acid so produced, condensing the same and passing the escape gases therefrom through an absorbing tower.

6. The process which consists in stirring a mixture of sodium nitrate and sulfuric acid together in a rarefied atmosphere while heating the materials to a temperature below the melting point of the niter cake formed, driving off the nitric acid so produced, condensing the same, passing the escape gases therefrom through an absorbing tower and obtaining the niter cake in pulverulent or friable condition.

In testimony whereof I have hereunto set my hand in the presence of two subscribing witnesses.

FREDRIK W. DE JAHN.

Witnesses:
 JOHN A. KEHLENBECK,
 G. V. RASMUSSEN